US010174789B1

(12) United States Patent
 Voelkel (10) Patent No.: US 10,174,789 B1
(45) Date of Patent: Jan. 8, 2019

(54) LOW FRICTION BEARING ASSEMBLY

(71) Applicant: Air Ride Technologies, Inc., Jasper, IN (US)

(72) Inventor: Bret Voelkel, Jasper, IN (US)

(73) Assignee: Air Ride Technologies, Inc., Jasper, IN (US)

( * ) Notice: Subject to any disclaimer, the term of this patent is extended or adjusted under 35 U.S.C. 154(b) by 0 days.

(21) Appl. No.: 15/710,070

(22) Filed: Sep. 20, 2017

(51) Int. Cl.
 *F16C 23/04* (2006.01)
 *F16C 33/38* (2006.01)
 *F16C 19/16* (2006.01)

(52) U.S. Cl.
 CPC .......... *F16C 33/3887* (2013.01); *F16C 19/16* (2013.01); *F16C 2229/00* (2013.01)

(58) Field of Classification Search
 CPC ...... F16C 23/043; F16C 23/045; F16C 27/02; F16C 33/06; F16C 33/20; F16C 2204/72; F16C 2226/74; F16C 2229/00
 See application file for complete search history.

(56) References Cited

U.S. PATENT DOCUMENTS

| 3,588,200 A | * | 6/1971 | Thomson | F16C 29/001 |
| | | | | 384/49 |
| 3,980,352 A | * | 9/1976 | Carlson | F16C 17/10 |
| | | | | 384/302 |
| 5,326,178 A | * | 7/1994 | Strobl | F16C 23/045 |
| | | | | 384/192 |

FOREIGN PATENT DOCUMENTS

WO WO-2006108389 A1 * 10/2006 ............. F16C 27/02

\* cited by examiner

*Primary Examiner* — Phillip A Johnson
(74) *Attorney, Agent, or Firm* — Ajay A. Jagtiani; Miles & Stockbridge P.C.

(57) ABSTRACT

An bearing assembly comprises a housing having a tapered interior bore, a ball bearing element, a ball bearing retainer disposed within the housing, wherein the ball bearing retainer has an interior bore for receiving the ball bearing element. The sides of the ball bearing retainer comprise a plurality of slots defining a plurality of fingers. The ball bearing element is disposed within the interior bore of the ball bearing retainer. A spring mechanism for maintaining a prescribed tension of the ball bearing element within the interior bore of the ball bearing retainer is disposed within the tapered interior bore of the housing. The bearing assembly may also include a locking mechanism for retaining the ball bearing element, the ball bearing retainer and the spring mechanism within the housing.

25 Claims, 9 Drawing Sheets

LOW FRICTION BEARING ASSEMBLY

BACKGROUND

Field of the Invention

The disclosed invention relates generally to bearing assemblies. More particularly, it relates to low friction bearing assemblies for use in a link apparatus.

Background of the Invention

Problems exist in prior art and commercially available rod end products and manufacturing.

Thus, there is a need for producing superior bearing assemblies employed in a variety of applications including, for instance, rod end assemblies.

SUMMARY

According to first broad aspect, the disclosed invention provides a bearing assembly comprising: a housing having a tapered interior bore; a ball bearing element; a ball bearing retainer disposed within the housing, wherein the ball bearing retainer has an interior bore for receiving the ball bearing element, wherein sides of the ball bearing retainer comprise a plurality of slots defining a plurality of fingers; wherein the ball bearing element is disposed within the interior bore of the ball bearing retainer; a spring mechanism for maintaining a prescribed tension of the ball bearing element within the interior bore of the ball bearing retainer disposed within the tapered interior bore of the housing; and a locking mechanism for retaining the ball bearing element, the ball bearing retainer and the spring mechanism within the housing.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

DETAILED DESCRIPTION OF THE INVENTION

Definitions

Where the definition of terms departs from the commonly used meaning of the term, applicant intends to utilize the definitions provided below, unless specifically indicated.

It is to be understood that the foregoing general description and the following detailed description are exemplary and explanatory only and are not restrictive of any subject matter claimed. In this application, the use of the singular includes the plural unless specifically stated otherwise. It must be noted that, as used in the specification and the appended claims, the singular forms "a," "an" and "the" include plural referents unless the context clearly dictates otherwise. In this application, the use of "or" means "and/or" unless stated otherwise. Furthermore, use of the term "including" as well as other forms, such as "include", "includes," and "included," is not limiting.

For purposes of the disclosed invention, the term "comprising", the term "having", the term "including," and variations of these words are intended to be open-ended and mean that there may be additional elements other than the listed elements.

For purposes of the disclosed invention, directional terms such as "top," "bottom," "upper," "lower," "above," "below," "left," "right," "horizontal," "vertical," "up," "down," etc., are used merely for convenience in describing the various embodiments of the disclosed invention. The embodiments of the disclosed invention may be oriented in various ways. For example, the diagrams, apparatuses, etc., shown in the drawing FIGS. may be flipped over, rotated by 90° in any direction, reversed, etc.

For purposes of the disclosed invention, a value or property is "based" on a particular value, property, the satisfaction of a condition, or other factor, if that value is derived by performing a mathematical calculation or logical decision using that value, property or other factor.

For purposes of the disclosed invention, it should be noted that to provide a more concise description, some of the quantitative expressions given herein are not qualified with the term "about." It is understood that whether the term "about" is used explicitly or not, every quantity given herein is meant to refer to the actual given value, and it is also meant to refer to the approximation to such given value that would reasonably be inferred based on the ordinary skill in the art, including approximations due to the experimental and/or measurement conditions for such given value.

For the purposes of the disclosed invention, the term "17-4 Grade Stainless Steel" refers to SAE type 630 stainless steel (more commonly known as 17-4; also known as UNS 17400)—a grade of martensitic precipitation hardened stainless steel. 17-4 Grade Stainless Steel contains approximately 15-17.5% (17) chromium and 3-5% (4) nickel, as well as 3-5% copper. 17-4 Grade Stainless Steel can be heat treated to high levels of strength and hardness, and features corrosion resistance and machinability comparable to austenitic 304 stainless. Being martensitic, 17-4 Grade Stainless Steel is magnetic. 17-4 Grade Stainless Steel is capable of being hardened up to approximately 44 Rc when heat treated to condition H900. Overaging (aging beyond the peak strength condition) improves resistance to stress corrosion cracking. Uses for 17-4 Grade Stainless Steel may include components which require high hardness and/or corrosion resistance at temperatures of up to 600° F. (316° C.). Specific applications for 17-4 Grade Stainless Steel may include the petroleum and chemical industries, as well as use in automotive, work machine and aircraft parts.

For the purposes of the disclosed invention, the term "bushing" refers to a type of bearing, a cylindrical lining designed to reduce friction and wear such as inside a hole.

For the purposes of the disclosed invention, the term "spring" refers to an elastic object that stores mechanical energy. When a spring is compressed or stretched from its resting position, it exerts an opposing force approximately proportional to its change in length (this approximation breaks down for larger deflections). The rate or spring constant of a spring is the change in the force it exerts, divided by the change in deflection of the spring. That is, it is the gradient of the force versus deflection curve.

For the purposes of the disclosed invention, the term "taper" refers to diminishing or reducing or causing to diminish or reduce in thickness toward one end.

For the purposes of the disclosed invention, the term "tensile strength" refers to the capacity of a material or structure to withstand loads tending to elongate (as opposed to compressive strength, which withstands loads tending to reduce size). In other words, tensile strength resists tension (being pulled apart), whereas compressive strength resists compression (being pushed together). Ultimate tensile strength is measured by the maximum stress that a material can withstand while being stretched or pulled before breaking.

For the purposes of the disclosed invention, the term "yield strength" or "yield stress" refers to the material property defined as the stress at which a material begins to deform plastically.

For the purposes of the disclosed invention, the term "yield point" refers to the point where nonlinear (elastic+ plastic) deformation begins. Prior to the yield point the material will deform elastically and will return to its original shape when the applied stress is removed. Once the yield point is passed, some fraction of the deformation will be permanent and non-reversible. The yield point determines the limits of performance for mechanical components, since it represents the upper limit to forces that can be applied without permanent deformation.

DESCRIPTION

While the invention is susceptible to various modifications and alternative forms, specific embodiment thereof has been shown by way of example in the drawings and will be described in detail below. It should be understood, however that it is not intended to limit the invention to the particular forms disclosed, but on the contrary, the invention is to cover all modifications, equivalents, and alternatives falling within the spirit and the scope of the invention.

Many automotive suspension system applications utilize commercially available rod end devices commonly known as Heim rod ends. Heim rod ends are used in automotive racing and aircraft suspension systems to allow for articulation in more than one plane. Doing so allows for movement to occur not only rotationally but axially. Heim rod ends may typically employ stainless balls as a common component within its rod end assembly. In convention Heim rod end applications, the manufacturer will typically line the bearing assembly housing with Teflon™ or another composite to achieve a smooth movement, initially noiseless operation, and maintaining a tight tolerance. However, the problem with such conventional configurations is that this design wears out quickly and also accommodates debris, dirt and/or foreign containments. As such systems wear, the internal bearing components typically rattle and make undesirable noise(s). Due to the accumulation of debris, dirt and/or foreign containments, such rod end bearing assemblies also bind up and, hence, and can become nonoperational.

Thus, commercially available rod ends, such as Heim rod ends, are inconsistent in their manufacturing quality and tolerances. For example, their assembled components are manufactured too tightly such that problems with squeaking exist. Or, another concern includes manufacturing the same such that the assembled components are manufactured too loosely in which rattling noises may occur. In some applications, prior art assemblies wear prematurely such that employed components also become loose fitting and generate noise over time.

In other prior art applications, manufactures may typically create and provide a rod end having a simple, single, plane busing unit. In this case, the manufacturer relies on the compliance of the bushing material to allow articulation. A common material for such cases includes rubber. While rubber may allow movement in all different planes, it sometimes allows for unintended movement and does not last very long. In addition, a degrade in the integrity of the material makes it sloppy over time. Polyurethane has been proposed as an upgrade material due to its stiffness. However, employed polyurethane applications do not provide as much movement. For example, polyurethane becomes sticky and resists rotational movement during operation. As it wears, polyurethane makes noise, squeaks and binds. Therefore, polyurethane is regarded as an inferior bushing material.

Other conventional assemblies utilize split bearing races (e.g., split axially) having, for example, two halves fitted together within a housing. However, such conventional assemblies have no way to expel dirt or debris. After degradation of the assembly occurs, conventional manufacturers are poised to sell re-build kits. In addition, typical assembly units are not spring loaded and often contain threaded closure nuts that are adjustable by the customer. By being split axially into two halves, for example, they leave the apex of the bearing ball element (i.e., that which is carrying the center of the load) unsupported and, therefore, susceptible to premature operational failure.

The disclosed invention is directed to an articulating swivel ball rod end. Disclosed embodiments, provide a bearing assembly that produces approximately 30 degrees of axial articulation (i.e., approximately 15 degrees in each direction from center (15×2)) and a full 360 degrees of rotational movement.

Figure 1:
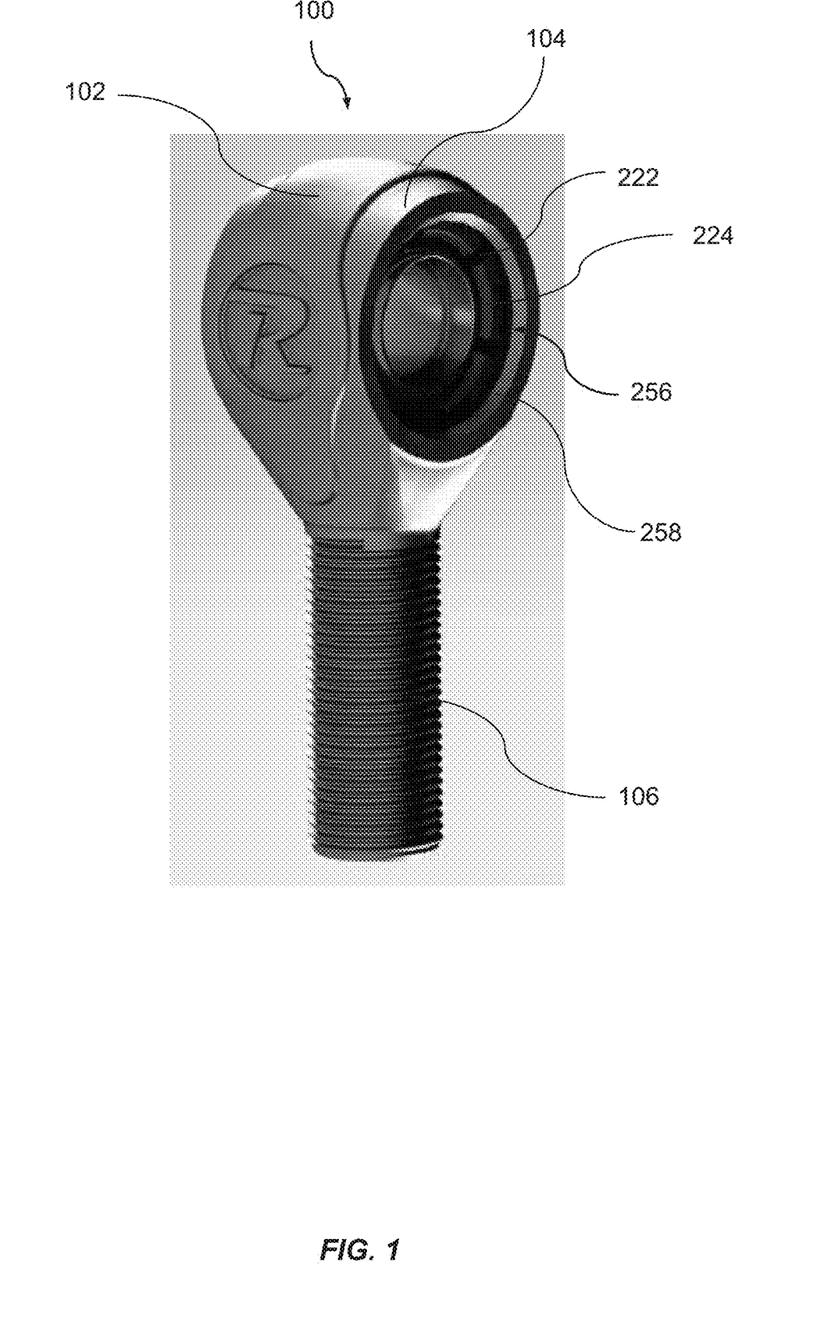
FIG. 1 is a perspective view of a bearing assembly according to one embodiment of the disclosed invention.

The disclosed design provides slots in prescribed bearing race that is self-cleaning. A disclosed anti-friction resin compound is utilized for the bearing race material that is proven to have superior wear qualities and superior yield strength to convention Teflon™ treated composites. The disclosed bearing race is spring loaded in combination with being fitted within a tapered bore of a bearing housing assembly. The unique design acts to keep and maintain the disclosed bearing assembly tight over a long range of operational use making it very durable and, hence, less resistant to obtaining squeaks or making noise Turning to FIG. 1, an assembled bearing assembly 100 is illustrated according to one embodiment of the disclosed invention. Bearing assembly 100 may include a housing 102 for receiving bearing components as discussed below. Housing 102 may extend from a main body portion 104 to an extended portion or shaft 106 for subsequent coupling to another apparatus, such as a connecting rod. In some disclosed embodiments, extended portion or shaft 106 may be configured as a threaded shaft portion for mating with complementary threads of another apparatus for connected the same thereto. It is readily appreciated that other configurations of main body 104 housing 102 in connection with other alternate extended portions may be achieved. For example, main body portion 104 of housing 102 may be connected to any appropriate structure (e.g., tubing or stand structure (not shown)), such as, via a weld connection. Regardless of any connection affixed or adhered to main body portion 104, components of the bearing assembly within housing 102 remain the same in accordance with disclosed embodiments as discussed herein. Material selection for housing 102 and extended portion or shaft 106 may include 17-4 Grade Stainless Steel sufficient for producing high tensile strength and yield strength.

Figure 2:
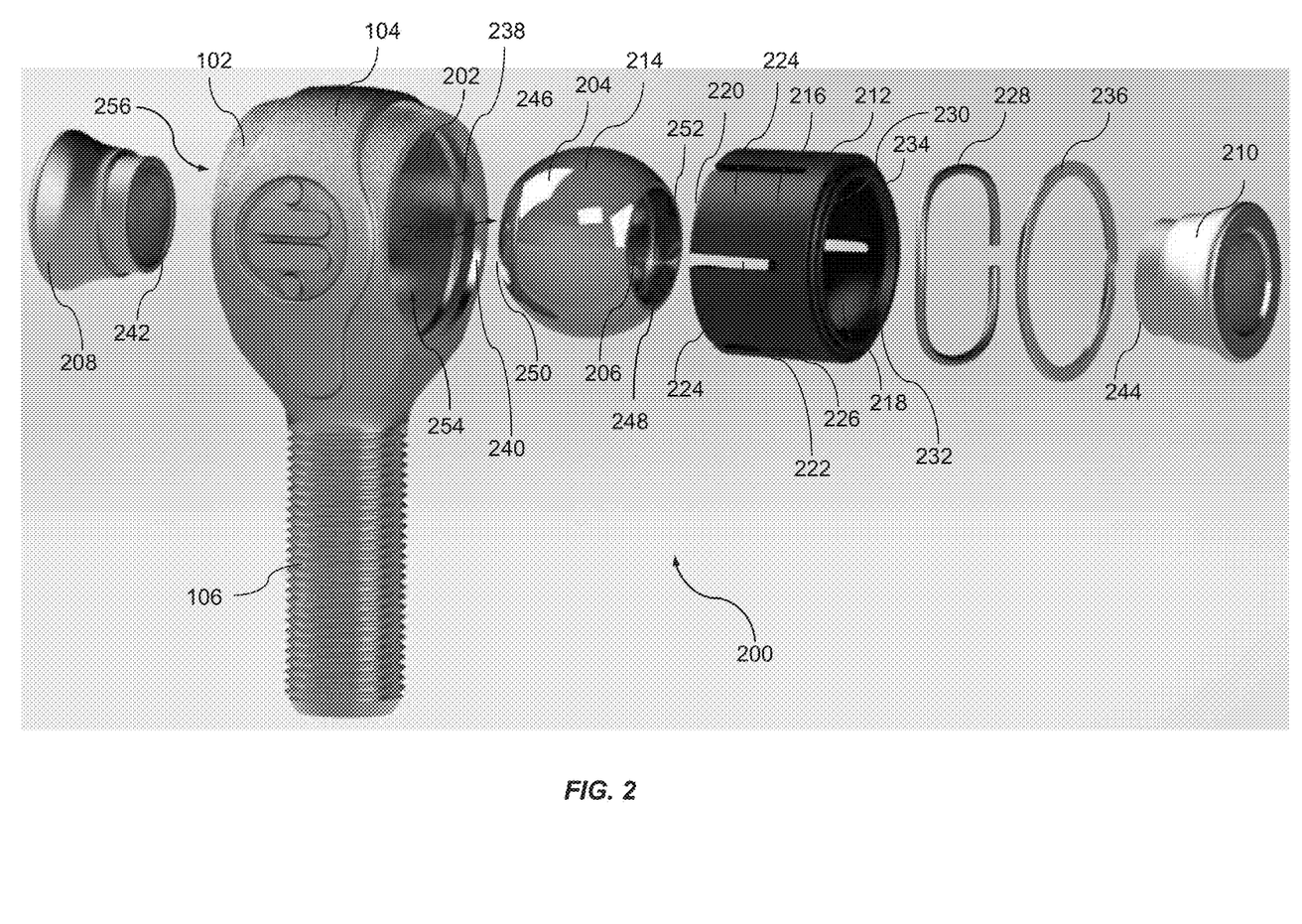
FIG. 2 is an exploded view of a bearing assembly according to one embodiment of the disclosed invention.

Turning to FIG. 2, illustrates an exploded view 200 of one embodiment of the disclosed bearing assembly. Stainless steel housing 102 is illustrated with main body 104 integrally connected with a threaded extended portion or shaft 106. Main body 104 includes an interior bore 202. Interior bore 202 may comprise a tapered inner diameter. A ball bearing element, such as a polished stainless steel ball 204, is provided and disposed within interior bore 202. Stainless steel ball 204 may comprise a passageway or counter bore 206 that traverses generally through the center of polished stainless steel ball 204 and extending from one end 250 to another opposite end 252 of polished stainless steel ball 204. Passageway or counter bore 206 allows for insertion of various sized elements such as fasteners and/or bearing spacers 208, 210, as described below. In some disclosed embodiments, bearing spacers 208, 210 may be employed to make the bearing assembly 100 for a rod end fit between specific bracket-type applications.

A ball bearing retainer, such as bearing race 212, is provided to be assembled in close fit arrangement between an exterior surface 214 of polished steel ball 204 and the interior bore 202 of main body 104. In a disclosed embodiment, a ⅝ swivel joint snap over bushing is employed as bearing race 212. Bearing race 212 may comprise a generally cylindrical body structure 216 including an interior bore 218 therethrough for receiving polished stainless steel ball 204 therein.

At one receiving end 220 of bearing race 212, a plurality of slots 222 may be cut along the sides 226 of bearing race 212 thereby producing and defining a plurality of fingers 224 therebetween. The material of bearing race 212 may be comprised of flexible material to provide adequate flexibility of the plurality fingers 224. Exemplary embodiments provide a one piece design of bearing race 212 having plurality of slots 222 which is conducive to economical manufacture.

As polished stainless steel ball 204 is positioned within the tapered interior bore 202, the plurality of fingers 224 flex about the geometric shape of polished steel ball 204 as bearing race 212 is urged within interior bore 202 of main body 104 in a fitted arrangement. Essentially, during fitting, the slots in bearing race 212 allow it to snap over polished stainless steel ball 204 for easy assembly. Accordingly, tapered interior bore 202 compresses the plurality of fingers 224 of bearing race 212 around polished steel ball 204 when bearing race 212 is inserted into tapered interior bore 202 of housing 102 in a final assembly as further illustrated, for example, in FIGS. 3 and 5. The aforementioned compression takes up any clearance and secures the assembled components in a tight fashion. Advantages of the disclosed embodiment also provide that the apex of polished steel ball 204 is positioned to carrying the center of the load. Thus, bearing assembly 100 is fully supported and is, therefore, less susceptible load failure thereby increasing the operational life of the disclosed invention.

In one exemplary embodiment, a first opening 254 is formed into main body 104 of housing 102 serving as an insertion opening for receiving polished stainless steel ball 204 within bearing race 212 during assembly. A second opening 256, opposite to first opening 254, is also formed into main body 104 of housing 102. Interior bore 202 may form a passageway that traverses generally through the center of main body 104 and extends from first opening 254 to second opening 256 of main body 104. In an assembled configuration the a passageway or counter bore 206 of polished stainless steel ball 204 may be configured in general axial alignment with interior bore 218 of bearing race 212 all of which being in general axial alignment with the passageway of interior bore 202 of main body 104.

A retaining lip 258 (FIG. 1) may be formed at and along, for example, an interior circumference of second opening 256. Thus, as bearing race 212 is urged through first opening 254 of main body 104, the edges of bearing race 212, such as edges of fingers 224, may generally abut retaining lip 258, thereby, preventing bearing race 212 from further displacement through first opening 254 and, hence, out of housing 102. Thus, bearing cage 212 come to bear against retaining lip 258.

The plurality of fingers 224 also serve to allow dirt, debris, foreign contaminants and/or moisture, etc., to be expelled from within the exterior of main body 104 thereby providing a clean working environment of the operational polished steel ball 204 during motion. To do so, foreign contaminants, such as dirt or debris, entering within main body 104 is scrapped off by the plurality of slots 222. The dirt or debris travels along the path of least resistance, such as within the plurality of slots 222, until it exits from main body 104 such as out of a back side of housing 102, outside the joint and away from polished steel ball 204. Accordingly, the disclosed bearing assembly is regarded as self-cleaning for maintaining the capability of removing dirt, debris, foreign contaminants and/or excessive moisture during operation.

In select embodiments bearing race 212 comprises a low friction/high wear resistance material such that no lubrication is required between bearing race 212 and polished steel ball 204 or interior bore 202. Thus, in one disclosed embodiment, a composite compound such as DuPont™ Delrin® AF (anti-friction) may be utilized as a select material of bearing race 212. DuPont™ Delrin® acetal copolymer resin is an engineering thermoplastic employed within high load mechanical application. Delrin® acetal copolymer resin combines low friction and high wear resistance with the stiffness and strength needed in parts designed to replace metal. It provides a wide operating temperature range, good colorability and good mating with metal and other polymers, as well as dimensional stability in high precision molding. Delrin® acetal copolymer also offers higher tensile strength, stiffness, and creep resistance, and significantly higher impact resistance, allowing for thinner and lighter part design, shorter molding cycles and the potential for cost reductions. Thus, the combination of a polished stainless steel ball 204 and disclosed selection of bearing race 212 materials allows smooth, consistent, low friction movement in the disclosed bearing assembly 100.

In one disclosed application, a specified acetal copolymer resin such as Celanese Celcon® LW90F5 may be employed as the select material of bearing race 212. Celcon LW90F5 is an M90 based acetal copolymer formulated with a tetrafluoroethylene filler. It is designed for use in wear applications against plastics, metal, glass or ceramic mating surfaces where silicone lubricants cannot be tolerated. Physical, mechanical, thermal and processing properties of Celcon LW90F5 are as follows:

|  | Metric | English | Comments |
|---|---|---|---|
| Physical Properties | | | |
| Density | 1.43 g/cc | 0.517 lb/in$^3$ | ASTM D792 |
|  | 1.50 g/cc | 0.542 lb/in$^3$ | ISO 1183 |
| Linear Mold Shrinkage | 0.022 cm/cm | 0.022 in/in | ASTM D955 |
| Linear Mold Shrinkage, Transverse | 0.018 cm/cm | 0.018 in/in | ASTM D955 |
| Mechanical Properties | | | |
| Tensile Strength, Yield | 48.0 MPa | 6960 psi | 50 mm/min; ISO 527-2/1A |
| Flexural Modulus | 2.30 GPa | 334 ksi | ISO 178 |
| Izod Impact, Notched (ISO) | 4.20 kJ/m$^2$ | 2.00 ft-lb/in$^2$ | ISO 180/1A |
| Thermal Properties | | | |
| Deflection Temperature at 1.8 MPa (264 psi) | 87.0° C. | 189° F. | ISO 75-1, -2 |
| Processing Properties | | | |
| Melt Temperature | 182-199° C. | 360-390° F. | |
| Mold Temperature | 77.0-93.0° C. | 171-199° F. | |
| Drying Temperature | 82.2° C. | 180° F. | |
| Dry Time | 3 hour | 3 hour | |
| Injection Pressure | 75.8-110 MPa | 11000-16000 psi | |

According to one disclosed embodiment, a spring mechanism 228 is utilized as a tension spring to facilitate maintaining a prescribed tension of polished stainless steel ball 204 within bearing race 212 disposed within interior bore 202. In one disclosed embodiment, spring mechanism 228 may comprise a wave spring (such as a wavy washer) provided in order to allow components of bearing assembly 100 to be spring loaded and remain under tension after assembly. In an exemplary embodiment, bearing race may be configured to retain spring mechanism 228, such as by a groove 230, defined and traversing, for example, the circumference of an edge 232 of bearing race 212 at one end 234. Thus, the body of spring mechanism 228 may be configured to fit within groove 230. A shape of groove 230 may be complimentary and correspond to the geometric shape and dimensions of spring mechanism 228 for retention therein. In one disclosed embodiment, groove 230 is generally circular in design which its diameter matching the circumference of edge 232.

During an original use of bearing assembly 100, where an initial break-in period of bearing assembly 100 occurs, a couple 1000ths of an inch may exist in initial wear between the polished stainless steel ball 204 and bearing race 212. When bearing race 212 relaxes a bit after an initial wear, the spring mechanism 228 (such as a wavy washer) works to compress bearing race 212 down into tapered interior bore 202 a degree to maintain proper tensioning of polished stainless steel ball 204 within bearing race 212 all of which within tapered interior bore 202 of housing 102. Due to the aforementioned proper tensions, the assembly of polished steel ball 204 and bearing race 212 doesn't become loose within main body 104 or generate undesirable noise (as is common in over conventional rod end bearing applications). A profile of spring mechanism 228 (such as wavy washer) may comprise a round stock which includes a calculated dimension to provide a prescribed poundage of pressure. In a select embodiment, groove 230 of bearing race 212 accommodates the geometric profile of wavy washer 228. In application, spring mechanism 228 provides about 110 lbs of tension (compression) to maintain close fitment between bearing race 212 and polished stainless steel ball 204. In one disclosed embodiment, Wavo® wave spring 17-7 PH Stainless Steel (RW-0125-517) may be employed as wavy washer 228.

A locking mechanism, such as snap ring or retainer ring 236, may be utilized to securely retain polished steel ball 204, bearing race 212 and wavy washer 228 within interior bore 202 of main body 104. In one embodiment, retainer ring 236 may be fit, for example, within a groove or lip 238 formed in housing 102. In some embodiments, retainer ring 236 may include a snap-ring design. Groove or lip 238 may be formed in an opening 240 of main body 104 within housing 102. In one select embodiment, a Spirolox® retaining ring, 2-turn 302 stainless steel may be employed as retainer ring 236. Once secured to main body 104, snap ring or retainer ring 236 maintains the positions and retains the components of bearing assembly 100 including polished steel ball 204, bearing race 212 and spring mechanism 228 within interior bore 202 of main body 104.

Once assembled, insertion ends 242, 244 of bearing pacers 208, 210 may be inserted through interior bore 218 of bearing race 212 and into respective insertion openings 246, 248 of counter bore 206. Insertion openings 246, 248 are disposed at ends 250, 252 of counter bore 206 of polished stainless steel ball 204.

Figure 3:
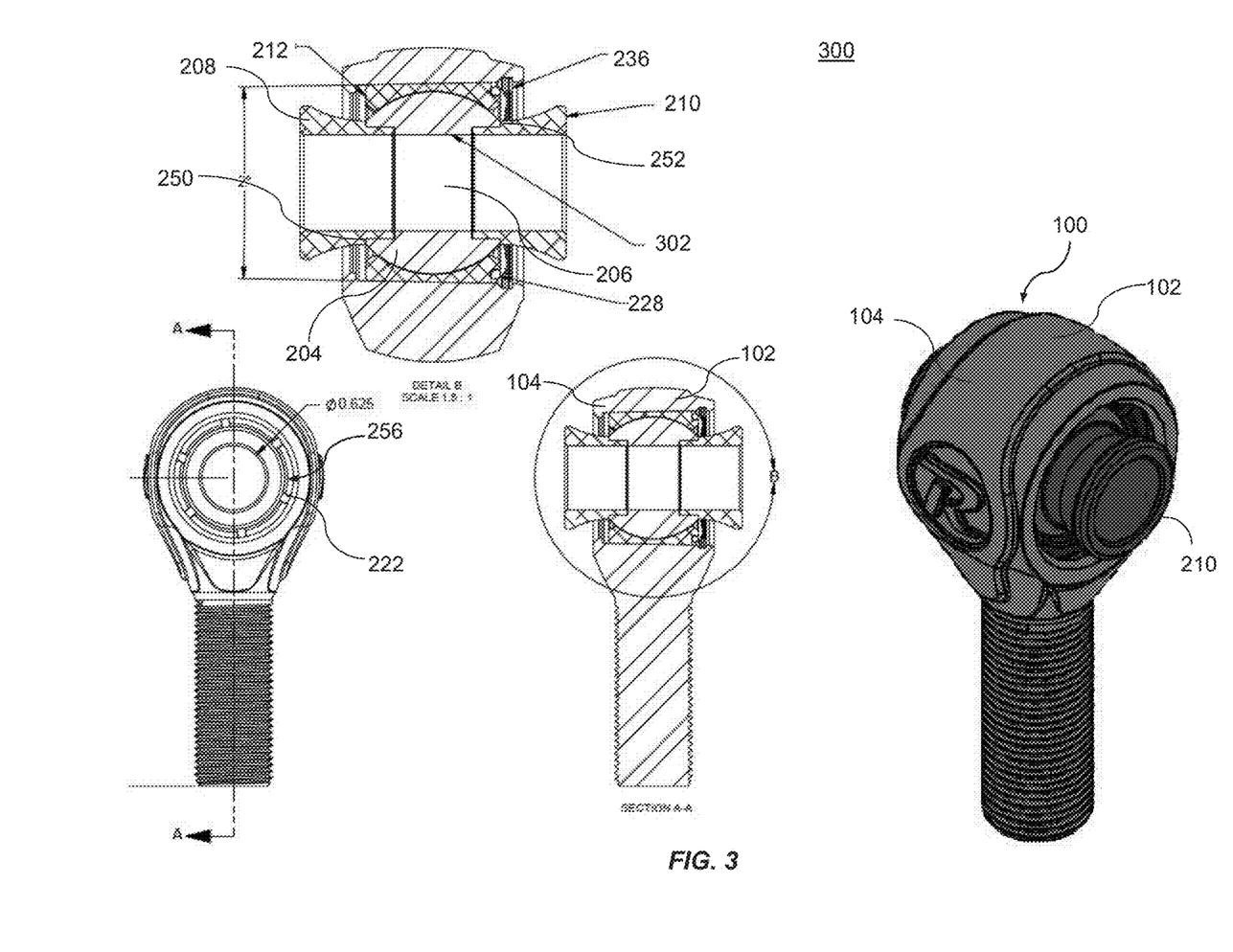
FIG. 3 illustrates assembled positional and cross sectional views of a bearing assembly including bearing spacers according to one embodiment of the disclosed invention.
Figure 4:
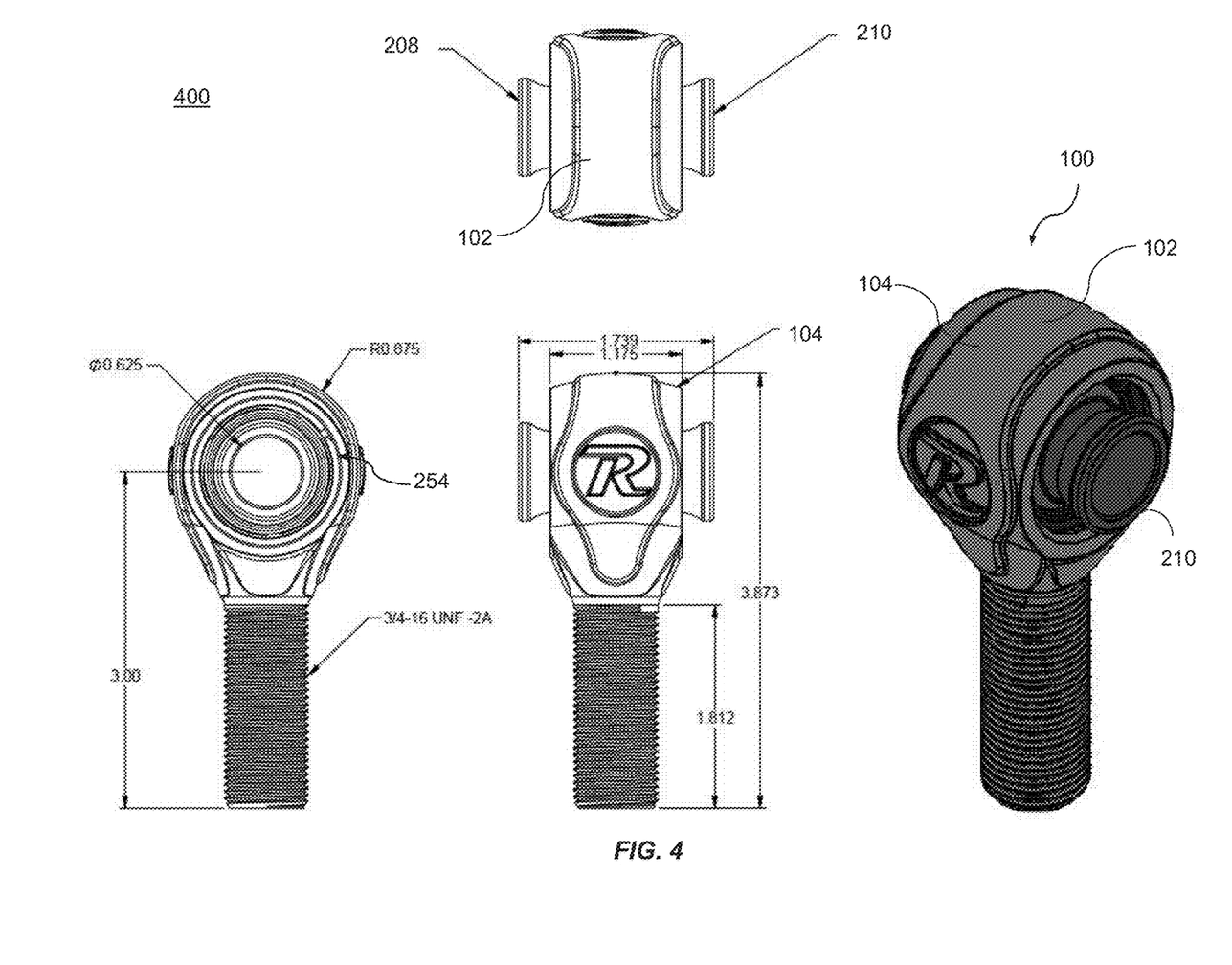
FIG. 4 illustrates various external views of an assembled bearing assembly including bearing spacers according to one embodiment of the disclosed invention.

Turning to FIGS. 3 and 4, assembled positional and cross sectional views 300, 400 of a bearing assembly 100 including bearing spacers 208, 210 are illustrated. Bearing spacers 208, 210 are disposed within the passageway or counter bore 206. In the illustrated cross-sectional configuration, the swivel joint center 302 is positioned such that counter bore 206 and, hence, ends 250, 252 are generally perpendicular to a vertical axis of the main body 104 of housing 102. Accordingly, bearing spacers 208, 210 disposed within ends 250, 252, respectively, are also positioned such that bearing spacers 208, 210 are generally perpendicular to a vertical axis of the main body 104 of housing 102.

Figure 5:
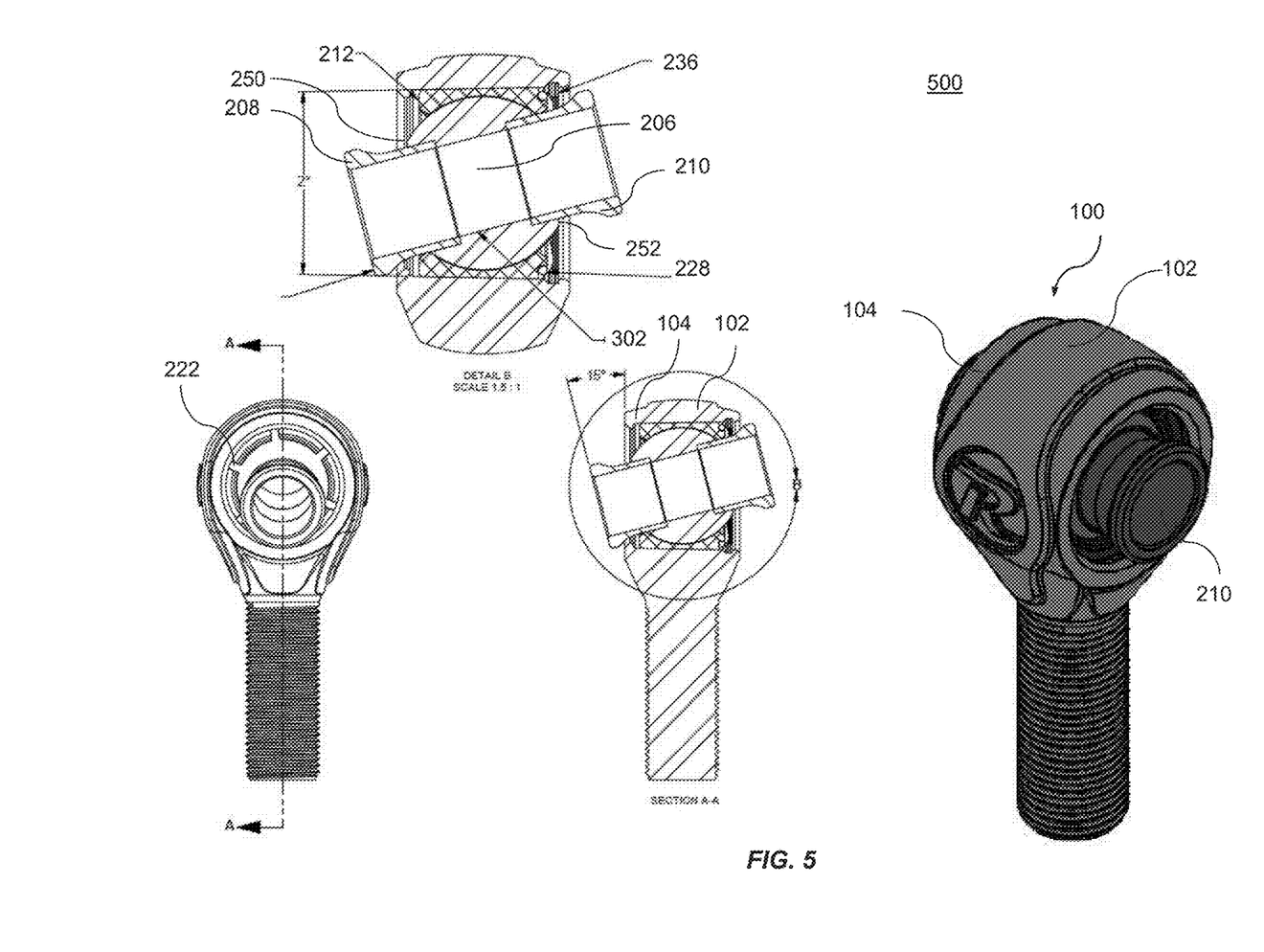
FIG. 5 illustrates another assembled positional and cross sectional view of a bearing assembly including bearing spacers according to one embodiment of the disclosed invention.

In accordance with disclosed embodiments, polished stainless steel ball 204 may rotate and swivel within bearing race 212. Turning to FIG. 5, another assembled positional and cross sectional view 500 of a bearing assembly 100 is illustrated including bearing spacers 208, 210. In this configuration, polished stainless steel ball 204 is rotated about swivel joint center 302 such that counter bore 206 and respective ends 250, 252 of are tilted within bearing race 212.

Accordingly, bearing spacers 208, 210 disposed within ends 250, 252, respectively, are also positioned such that bearing spacers 208, 210 are tilted with respect to swivel joint center 302 (i.e., rotated about a vertical axis of the main body 104 of housing 102). In a disclosed embodiment, the bearing spacer 208, 210 configuration provides an adjustment of up to 15° from vertical.

Figure 6:
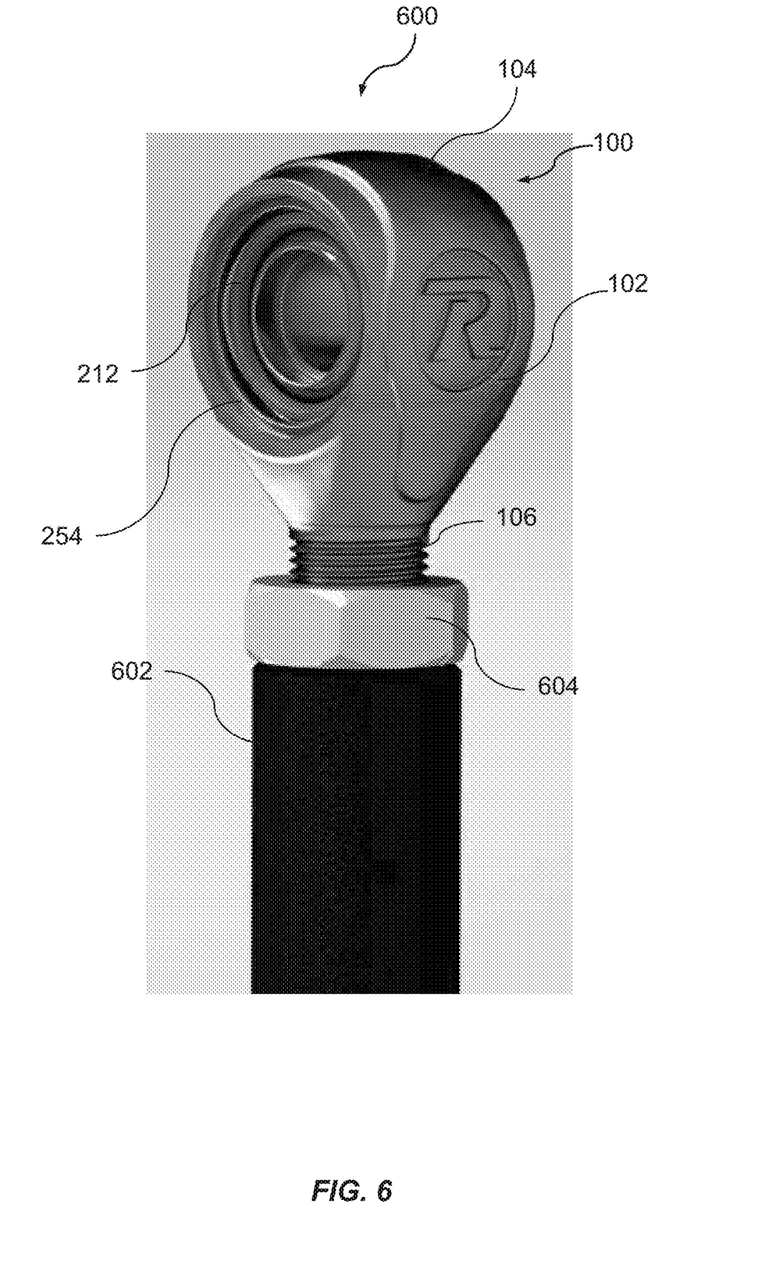
FIG. 6 illustrates an assembled bearing assembly coupled with a connecting rod according to one embodiment of the disclosed invention.

The bearing rod connection assembly 600 of FIG. 6 illustrates an assembled bearing assembly 100 coupled with a connecting rod 602. Extended portion or shaft 106 is threaded to mate with corresponding internal threads of connecting rod 602. An adjustment mechanism 604 may be provided for adjusting a position of bearing assembly 100 with respect to connecting rod 602 to provide for varying lengths of the bearing rod connection assembly 600.

Figure 7:
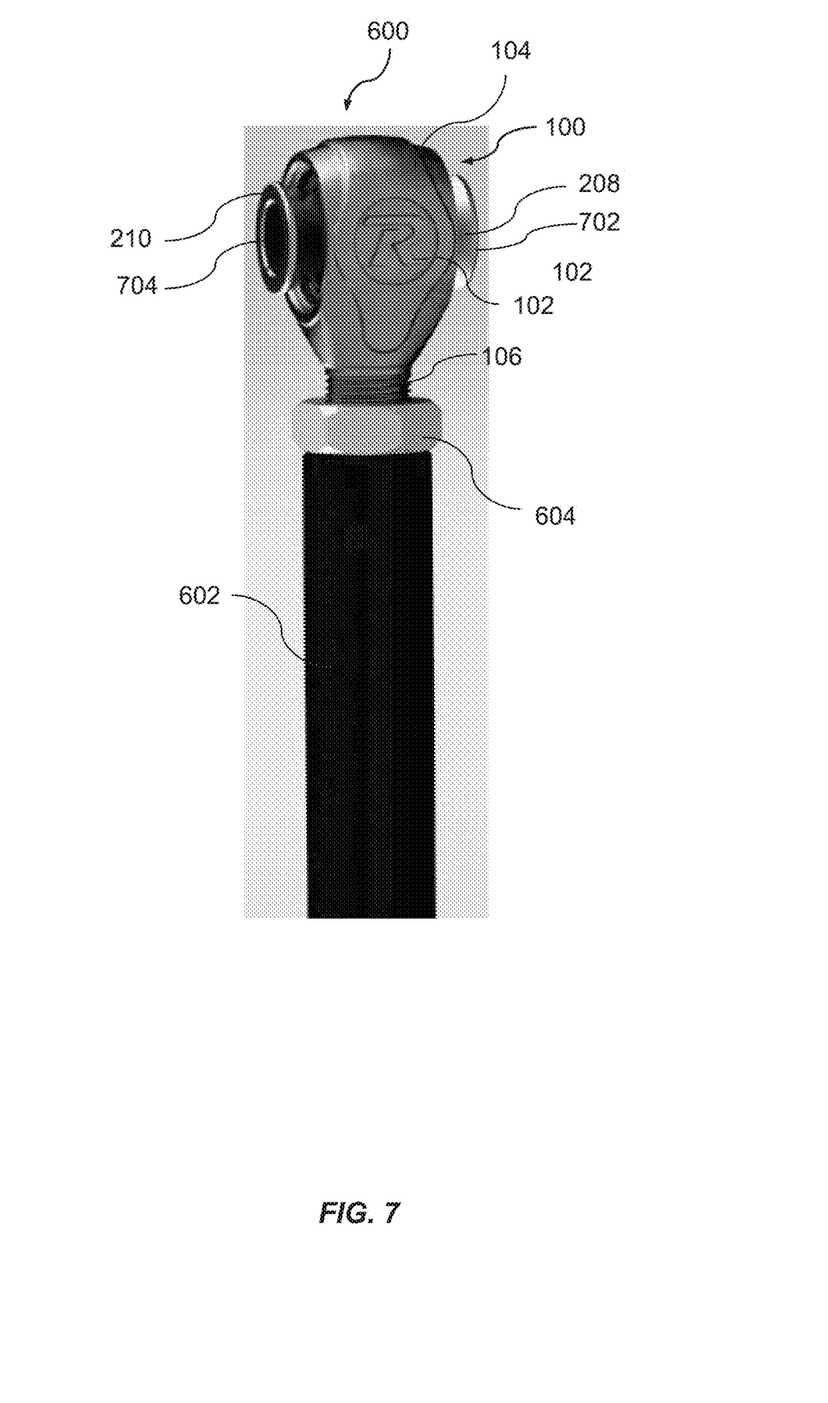
FIG. 7 illustrates an assembled bearing assembly with bearing spacers coupled with a connecting rod according to one embodiment of the disclosed invention.
Figure 8:
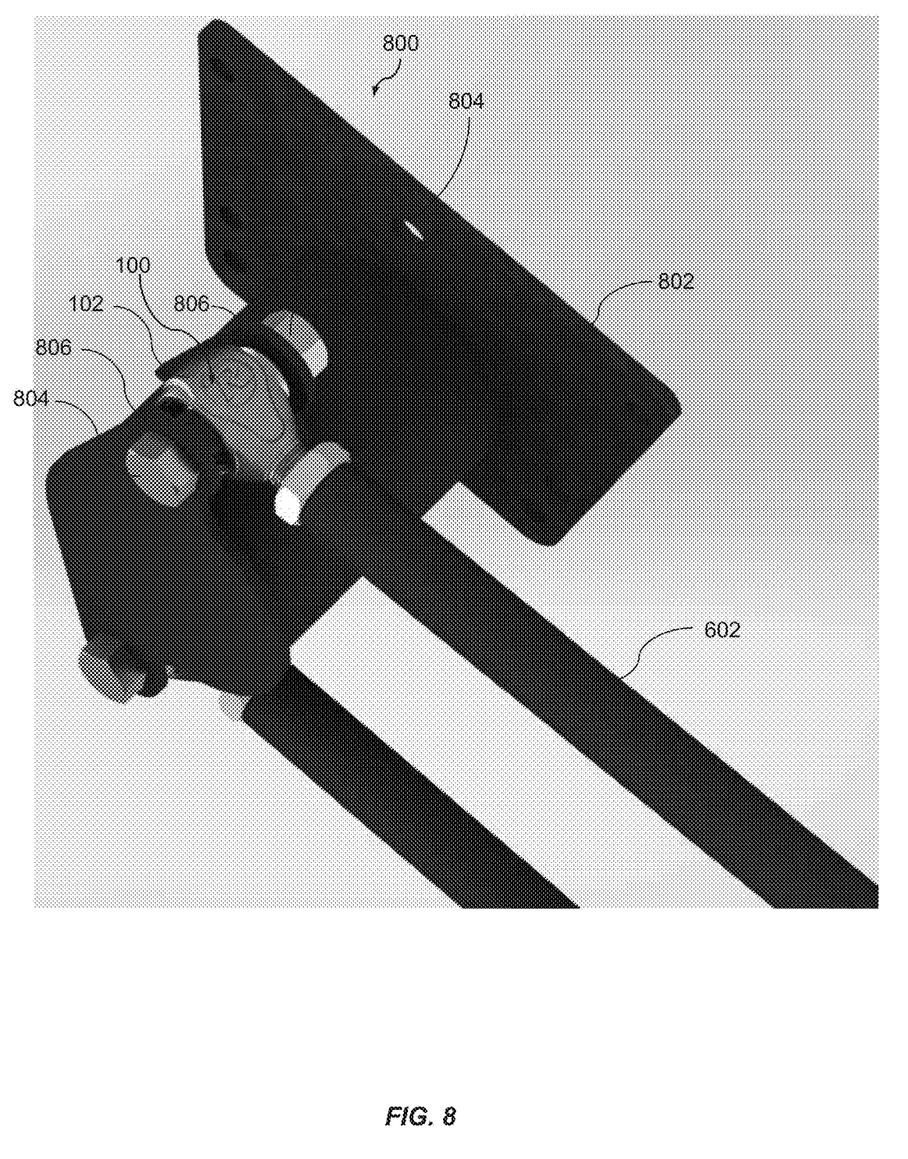
FIG. 8 illustrates a perspective view of a bearing assembly in connection with a mounting bracket according to one embodiment of the disclosed invention.
Figure 9:
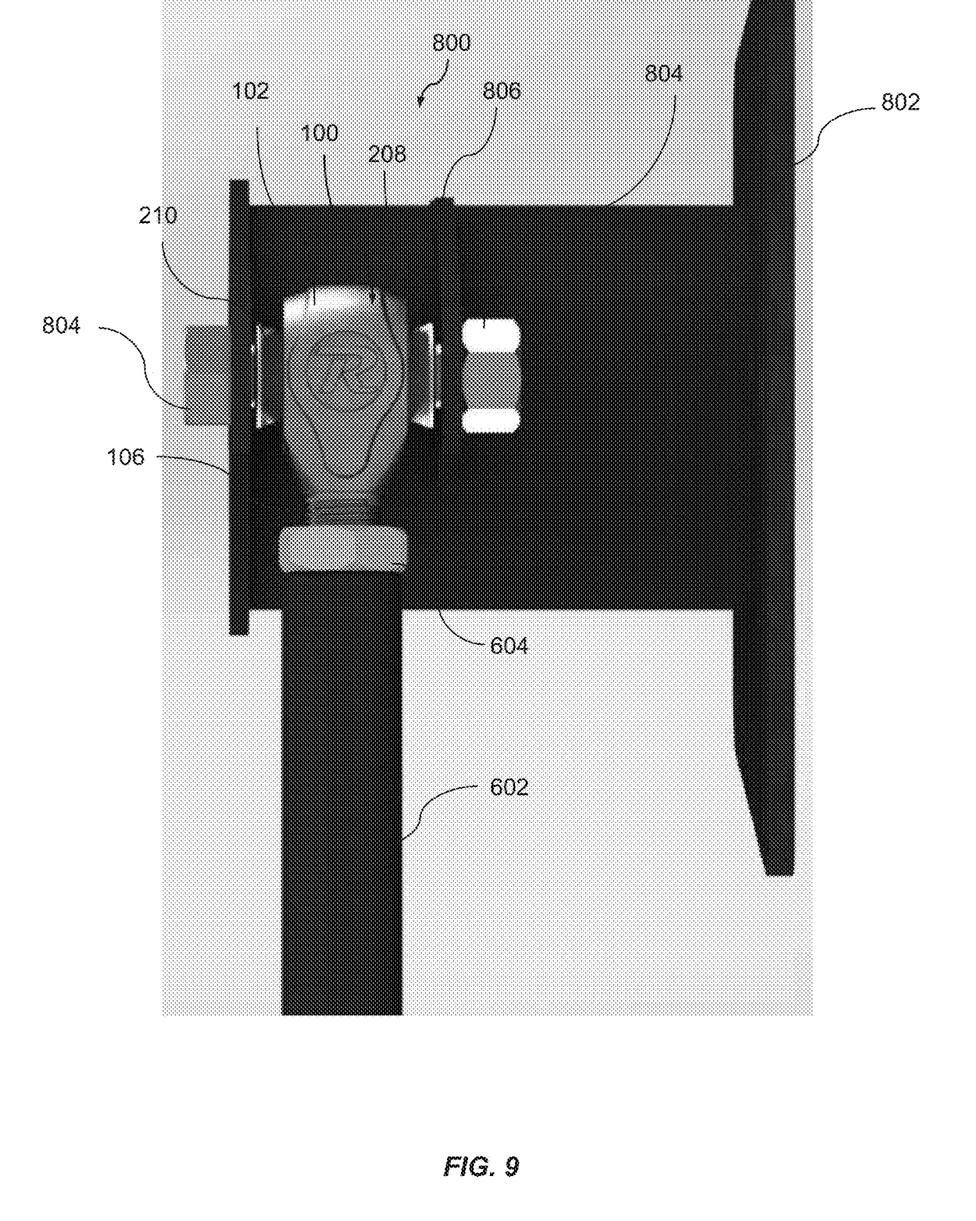
FIG. 9 illustrates a side view of the bearing assembly in connection with the mounting bracket of FIG. 7 according to one embodiment of the disclosed invention.

The bearing rod connection assembly 600 illustrated in FIG. 7 includes bearing spacers 208, 210 disposed within ends 250, 252 of polished stainless steel ball 204. The disclosed setup is primed for receiving fasters through openings 702, 704 of bearing spacers 208, 210, respectively, and through the passageway or counter bore 206 of polished stainless steel ball 204. Turning to FIGS. 8 and 9, a configuration 800 of the disclosed bearing assembly 100 is shown in connection with connecting rod 602 and fastened to a mounting plate 802. A fastener assembly 804 is disposed through passageway or counter bore 206 and openings 702, 704 of bearing spacers 208, 210, respectively, and through connecting brackets 806 of mounting plate 802. In one embodiment, fastener assembly 804 may employ threaded screws and nuts for retaining bearing assembly 100 to mounting brackets 806. It is readily appreciated that any-type fastener assembly sufficient for retaining the disclosed bearing assembly 100 through passageway or counter bore 206 may be utilized.

Thus, disclosed embodiments provide an improved bearing assembly 100. Improvements include capability to support the apex of the ball bearing element, i.e., the load center for providing increased strength and operational performance. The disclosed design provides a stainless rod end housing tapered slightly to compress the slotted resin compound race upon assembly. The combination of the tapered bore, slotted race, and wavy washer provide consistent low friction operation over a prolonged operational life of the disclosed bearing assembly. Disclosed embodiments maintain a self-cleaning environment/product capable of excluding and, if necessary, expelling debris, dirt and/or foreign materials. Furthermore, disclosed elements provide capability for maintaining tension on the bearing assembly to maintain tolerances within prescribed specifications. While some dimensions have been presented for illustrative purpose(s) only, it is readily appreciated that disclosed embodiments may be incorporated in a variety of sizes and configurations to address a wide range of applications.

It should be noted and understood that while the above and other advantages and results of the disclosed invention will become apparent to those skilled in the art from the following detailed description and accompanying drawings, showing the contemplated novel construction, combinations, and elements herein described, and more particularly defined by the appended claims, it should be clearly understood that changes in the precise embodiments of the herein described invention are meant to be included within the scope of the claims, except insofar as they may be precluded by the prior art.

Having described the many embodiments of the disclosed invention in detail, it will be apparent that modifications and variations are possible without departing from the scope of the invention defined in the appended claims. Furthermore, it should be appreciated that all examples in the present disclosure, while illustrating many embodiments of the invention, are provided as non-limiting examples and are, therefore, not to be taken as limiting the various aspects so illustrated.

All documents, patents, journal articles and other materials cited in the present application are incorporated herein by reference.

While the disclosed invention has been disclosed with references to certain embodiments, numerous modification, alterations, and changes to the described embodiments are possible without departing from the sphere and scope of the disclosed invention, as defined in the appended claims. Accordingly, it is intended that the disclosed invention not be limited to the described embodiments, but that it has the full scope defined by the language of the following claims, and equivalents thereof.

What is claimed is:

1. A bearing assembly comprising:
   a housing having a tapered interior bore;
   a ball bearing element;
   a ball bearing retainer disposed within the housing,
   wherein the ball bearing retainer has an interior bore for receiving the ball bearing element,
   wherein sides of the ball bearing retainer comprise a plurality of slots defining a plurality of fingers;
   wherein the ball bearing element is disposed within the interior bore of the ball bearing retainer;
   a spring mechanism for maintaining a prescribed tension of the ball bearing element within the interior bore of the ball bearing retainer disposed within the tapered interior bore of the housing; and
   a locking mechanism for retaining the ball bearing element, the ball bearing retainer and the spring mechanism within the tapered interior bore of the housing.

2. The hearing assembly of claim 1, wherein the ball hearing element comprises a counter bore traversing generally through a center of the ball hearing element and extending from one end to another opposite end of the ball bearing element.

3. The bearing assembly of claim 2, wherein the tapered interior bore comprises a passageway traversing generally through a center of the housing and extending from a first opening to a second opposite opening of the housing.

4. The bearing assembly of claim 3, wherein the counter bore of the ball bearing element is configured in general axial alignment with the interior bore of the ball bearing retainer and in general axial alignment with the passageway of the housing.

5. The bearing assembly of claim 2, wherein the counter bore is configured to receive bearing spacer elements.

6. The hearing assembly of claim 1, wherein the ball hearing element comprises a polished stainless steel ball.

7. The bearing assembly of claim 1, wherein the ball bearing retainer comprises a bearing race.

8. The bearing assembly of claim 7, wherein the bearing race is non-metallic.

9. The bearing assembly of claim 8, wherein the bearing race comprises acetal copolymer resin.

10. The hearing assembly of claim 9, wherein the bearing race comprises a tensile strength up to about 6960 psi.

11. The bearing assembly of claim 1, wherein the spring mechanism is secured within the housing to maintain a close fitment between the ball bearing retainer and the ball bearing element.

12. The bearing assembly of claim 11, wherein the hall bearing retainer is configured to retain the spring mechanism.

13. The bearing assembly of claim 12, wherein the ball bearing retainer comprises a groove for receiving and retaining the spring mechanism.

14. The bearing assembly of claim 13, wherein the shape of the groove is complimentary to the geometric shape of the spring mechanism.

15. The bearing assembly of claim 12, wherein the spring mechanism is configured to impart about 110 lbs of compression on the ball bearing retainer to maintain the close fitment between the ball bearing retainer and the ball bearing element within the tapered interior bore.

16. The bearing assembly of claim 11, wherein the locking mechanism retains the ball bearing element within the interior bore of the ball bearing retainer, the ball bearing retainer within the tapered interior bore of the housing, and the spring mechanism.

17. The bearing assembly of claim 16, wherein the ball bearing retainer is compressed by the tapered interior bore around the ball bearing element in a final assembly.

18. The bearing assembly of claim 17, wherein the plurality of fingers flex about the geometric shape of the ball bearing element.

19. The bearing assembly of claim 18, wherein the ball bearing retainer snaps over the ball bearing element.

20. The bearing assembly of claim 16, wherein the locking mechanism comprises a snap ring.

21. The bearing assembly of claim 16, wherein the spring mechanism is disposed between the ball hearing retainer and the locking mechanism within the housing.

22. The bearing assembly of claim 1, wherein a body of the housing extends into an extended portion.

23. The bearing assembly of claim 22, wherein the housing and the extended portion comprise 17-4 Grade Stainless Steel material.

24. The bearing assembly of claim 22, wherein the extended portion is threaded.

25. The bearing assembly of claim 1, wherein the bearing assembly is configured to produce approximately 30 degrees of axial articulation and 360 degrees of rotational movement.

* * * * *